United States Patent
McKinley

(10) Patent No.: US 7,805,734 B2
(45) Date of Patent: Sep. 28, 2010

(54) PLATFORM MANAGEMENT OF HIGH-AVAILABILITY COMPUTER SYSTEMS

(75) Inventor: David James McKinley, Cypress, TX (US)

(73) Assignee: Augmentix Corporation, Austin, TX (US)

( * ) Notice: Subject to any disclaimer, the term of this patent is extended or adjusted under 35 U.S.C. 154(b) by 1308 days.

(21) Appl. No.: 11/324,730

(22) Filed: Dec. 30, 2005

(65) Prior Publication Data

US 2008/0010315 A1 Jan. 10, 2008

(51) Int. Cl.
*G06F 13/00* (2006.01)
(52) U.S. Cl. .................. 719/328; 719/318; 707/609; 707/999.001; 707/999.102
(58) Field of Classification Search ............... 719/318, 719/328; 707/1, 102, 609, 999.001, 999.102
See application file for complete search history.

(56) References Cited

U.S. PATENT DOCUMENTS

| | | | | |
|---|---|---|---|---|
| 7,565,416 B1 * | 7/2009 | Shafer et al. | ................ | 709/220 |
| 7,627,617 B2 * | 12/2009 | Kavuri et al. | ................ | 707/204 |
| 2004/0143599 A1 * | 7/2004 | Shalabi et al. | ........... | 707/104.1 |
| 2006/0041580 A1 * | 2/2006 | Ozdemir et al. | ............. | 707/102 |
| 2006/0248371 A1 * | 11/2006 | Chen et al. | ..................... | 714/4 |
| 2008/0208926 A1 * | 8/2008 | Smoot et al. | ................ | 707/203 |
| 2008/0240104 A1 * | 10/2008 | Villait et al. | ................ | 370/392 |

* cited by examiner

*Primary Examiner*—Andy Ho
(74) *Attorney, Agent, or Firm*—Sprinkle IP Law Group

(57) ABSTRACT

Software for platform management of high-availability computer systems is provided. A management database can be configured for storing the data about the set of management instruments and the set of management capabilities that are required for the platform management. Further, an application program interface (API) and a command line interface (CLI) are provided for administering of the hardware platform by reading and updating the state of set of management instruments, and the set of management capabilities. Execution of a policy in the occurrence of a pre-defined trigger event can be enabled by a policy execution module.

30 Claims, 9 Drawing Sheets

PLATFORM MANAGEMENT OF HIGH-AVAILABILITY COMPUTER SYSTEMS

BACKGROUND

The present invention generally relates to platform management of computer systems. More specifically, the present invention relates to the platform management of high-availability computer systems.

Modern integrated computer systems provide multiple services like voice and data transmission, system management, security, wireless communication, video conferencing, web services, etc. These computer systems are assembled, using various hardware and software components, better known in the industry as Commercial-off-the-shelf (COTS) components, which are sourced from multiple vendors. These computer systems provide continuous services to the users even if hardware and software faults occur or the COTS components are being upgraded. The Service Availability Forum (SAF), an industry consortium of telecommunication and computer equipment manufacturers and users, provides specifications that provide open standards for high-availability computer systems, including the Hardware Platform Interface (HPI) specification for platform management of computer systems.

Management software can enable the use of the COTS components to construct high-availability systems and services that provide uninterrupted services to the users. The management software allows users to set and retrieve configuration and operational data related to the COTS components. The management software can control the operation of the COTS components. Examples of operations may include starting up, shutting down, and testing of the COTS components. The management software typically accomplishes these functions by modeling a computer system, reflecting the current state of the computer system in that model, and providing an interface through which user application programs can inquire about the current state. Additionally, the management software can also update hardware platform of the computer system when the user application programs, through the interface provided by the software, update the state of the model.

The HPI specification provides structures for modeling the computer system in the form of sets of resources and domains. A resource is an abstract representation of a part of one or more parts of the computer system, the representation includes a set of management instruments and a set of management capabilities. The set of management instruments and the set of management capabilities are used for reflecting and changing the current state of hardware platform of the computer system. A domain is an abstract collection of resources. Each resource can be a member of one or more domains. Several resources can be used to model the management capabilities for hardware platform of computer system.

Each resource can include one or more management instruments and one or more management capabilities. Examples of the management instruments are sensors, controls, inventory data repositories, watchdog timers, and annunciators. Examples of the management capabilities are power control, reset control, configuration parameter control, hot swap management, event generation, and event log maintenance. For example, by accessing a management instrument recognized as a 'control' through an application program interface (API), a user-application program can change the configuration or operational parameters of the hardware platform of the computer system. However, the 'control' can also be set to an 'automatic' mode, as defined in the HPI specifications. When the user-application program cedes operation of the 'control' to a set of built-in autonomous functions in the hardware platform, the control is referred to be set in the automatic mode. While the HPI specification makes provisions for autonomous functions in the hardware platform, these functions are not defined in the specification. The HPI specification describes only the API for enabling the platform management of the computer systems.

Conventional mechanisms for platform management of high-availability computer systems may only provide the API for allowing user application programs to administer the hardware platform of the computer system. For high-availability computer systems, autonomous functions are required in the computer system to detect and react to system fault conditions. These autonomous functions may not have a standardized way of implementation. Further, the autonomous functions are not coupled and coordinated with the API.

In view of the foregoing discussion, there is a need for software for platform management of high-availability computer systems. The software for the platform management of the high availability computer systems should enable the administering of the hardware platform of the computer systems by means of the autonomous functions. Further, there is a need for the standardized provision of implementing the autonomous functions that can operate on the computer system. Furthermore, there is a need for software for platform management of the high-availability computer systems that can integrate both the API and the autonomous functions to administer the hardware platform.

SUMMARY

An object of the invention is to provide software for platform management of the high-availability computer systems.

Another object of the invention is to provide software for implementing autonomous functions that can operate on the computer system.

Yet another object of the invention is to provide software for integrating both the API and the execution of the autonomous functions in a standardized way to administer the hardware platform.

A computer program product, a method and a system are provided for platform management of the high-availability computer systems. The computer program product comprises a computer program code implementing software for platform management of the high-availability computer systems. The software includes a management database for modeling the computer system as a set of management instruments and a set of management capabilities, and storing data about the computer system. The software also includes an application program interface (API) for administering the hardware platform of the computer system by accessing and updating the management database. A command line interface (CLI) is also provided to administer the hardware platform separately from the API, also by accessing and updating the management database. Further, a policy execution module is provided for enabling execution of policies by the CLI. A policy is executed when a pre-defined trigger event of one or more pre-defined trigger events occur. The policy can be used to perform autonomous functions on the set of management instruments and the set of management capabilities. The policies can also be used to implement a virtual management instrument that references other management instruments from the set of management instruments. The defined management instruments can also include private management instruments that are not exposed for access to the user application programs through the API. The system administrators of the computer systems can also directly enter and execute commands from the CLI. These commands can be defined for reading and updating the state of the set of management instruments and the set of management capabilities.

BRIEF DESCRIPTION OF THE DRAWINGS

So that the manner in which the above recited features of the present invention can be understood in detail, a more particular description of the invention, briefly summarized above, may be had by reference to various embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF VARIOUS EMBODIMENTS

Various embodiments of the invention relate in general to platform management of computer systems. More specifically, the embodiments of the invention relate to the platform management of high-availability computer systems.

Figure 1A:
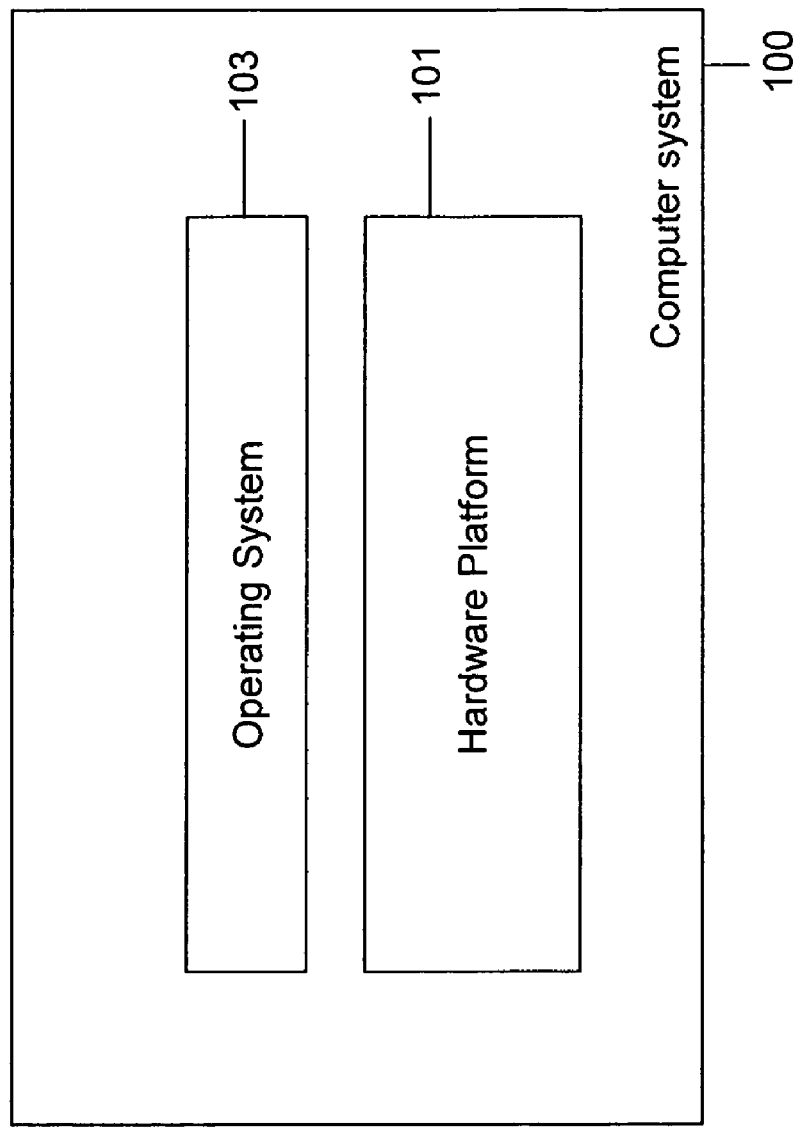
FIGS. 1a and 1b illustrate a computer system.
Figure 1B:
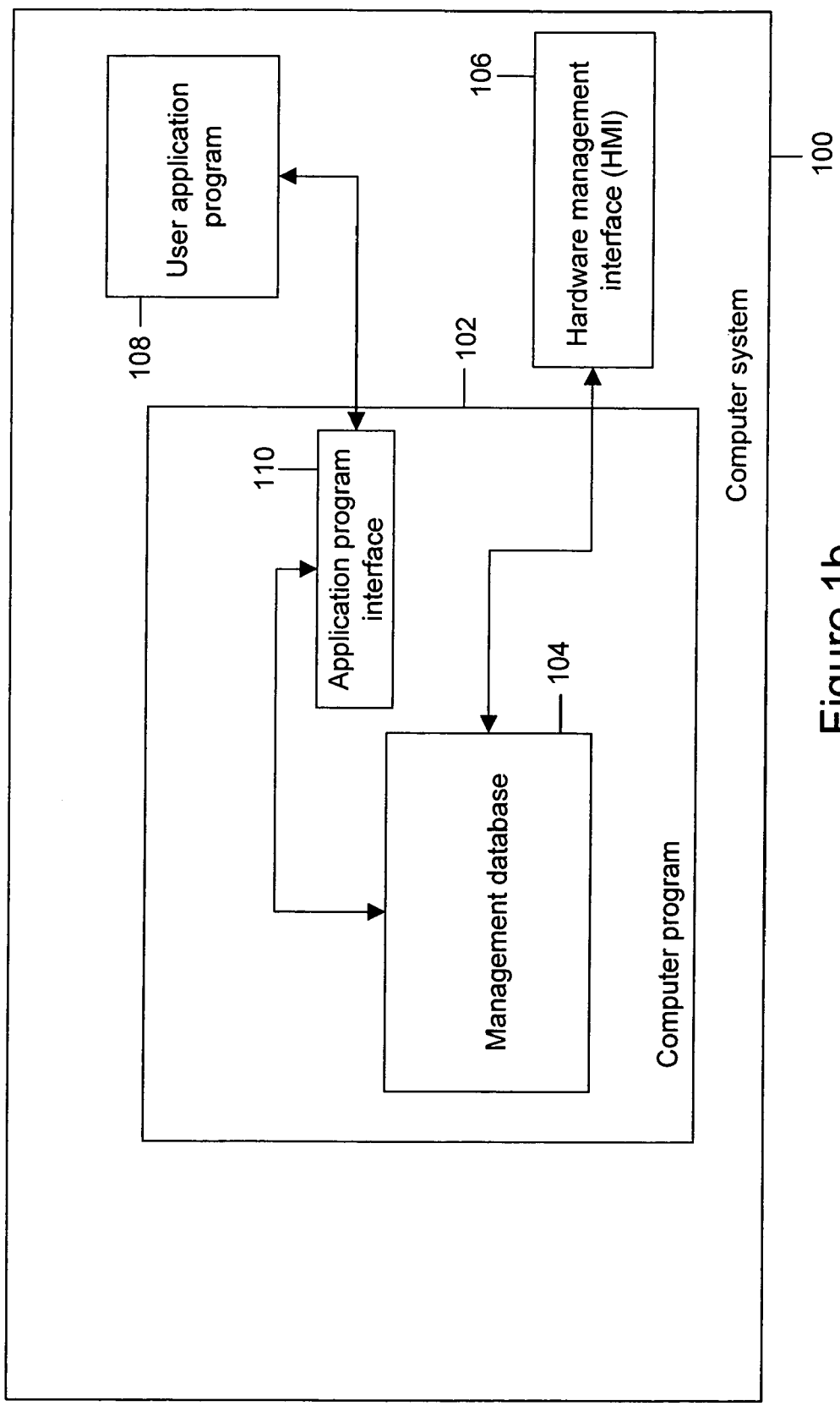

FIGS. 1a and 1b illustrate a computer system 100. Computer system 100 comprises a hardware platform 101 and an operating system 103, as shown in FIG. 1a. In addition, computer system also includes a computer program 102, as shown in FIG. 1b. Computer program 102 includes a management database 104. Management database 104 is used for modeling of computer system 100. Management database 104 reflects the current state of computer system 100. Computer system 100 further includes a hardware management interface (HMI) 106 that can be used to provide the information about the current state of computer system 100 or to change the state of computer system 100. Computer system 100 may also include a user application program 108 that can access computer program 102 through an application program interface (API) 110. API 110 is used for administering computer system 100 by accessing management database 104 and changing the model included in management database 104.

Figure 2:
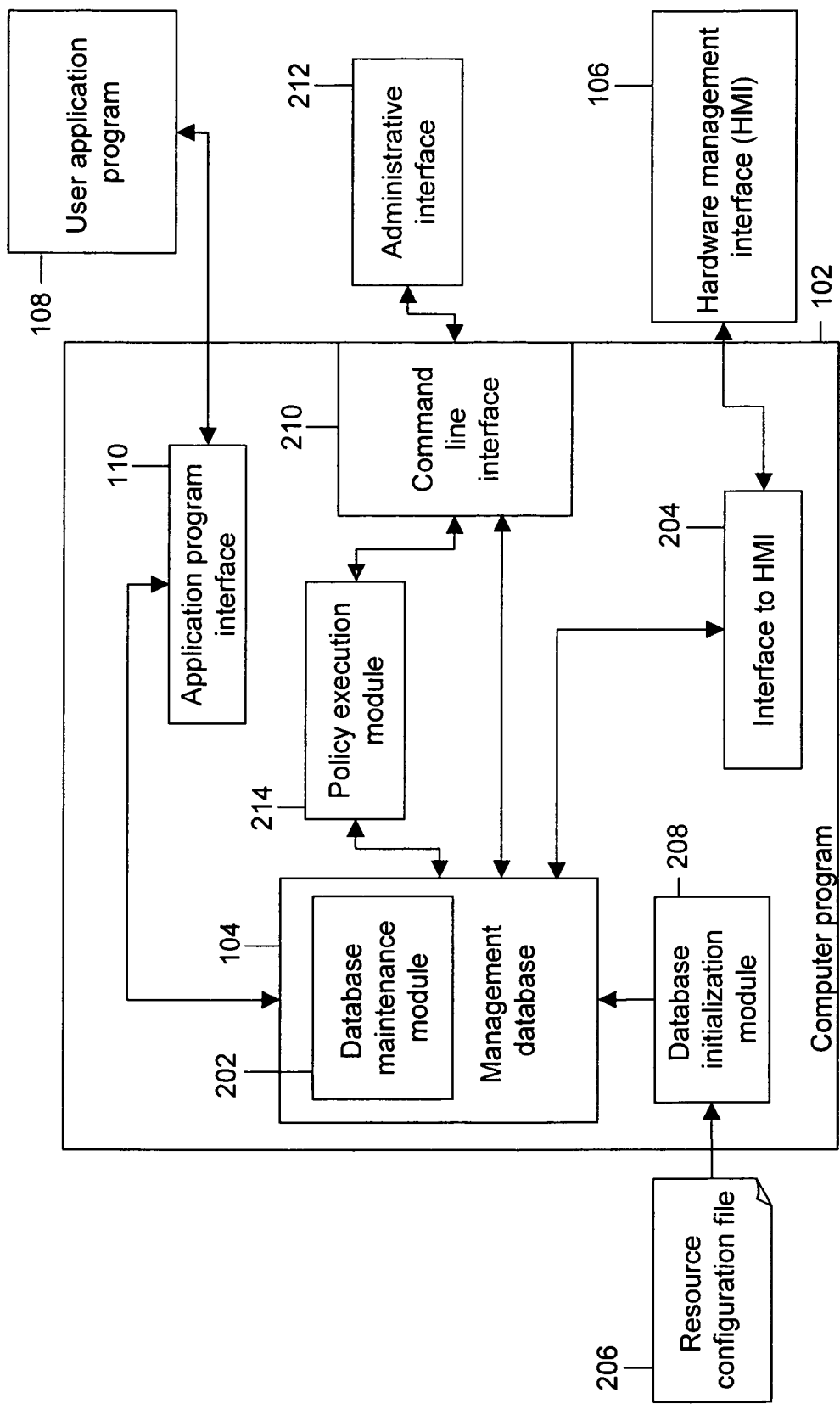
FIG. 2 is a view illustrating a schematic representation of various modules in a computer program used for platform management of high-availability computer systems, in accordance with an embodiment of the invention.

FIG. 2 is a view illustrating a schematic representation of various modules in computer program 102 used for platform management of high-availability computer systems, in accordance with an embodiment of the invention. Computer program 102 includes management database 104. Management database 104 contains a set of management instruments and a set of management capabilities that are used for modeling of computer system 100. In an embodiment of the invention, the set of management instruments may include sensors, controls, watchdog timers, inventory data repositories, and annunciators. The set of management capabilities may include power control, reset control, hot swap management, event generation, and event log maintenance. The set of management instruments and the set of management capabilities are used to reflect the current state of computer system 100. The set of management instruments and the set of management capabilities are also used to change the current state of computer system 100. Management database 104 comprises a database maintenance module 202 for maintaining configuration information of the set of management instruments. Database maintenance module 202 continuously updates the state of the set of management instruments and the set of management capabilities. An interface 204 to HMI 106 is used for reading information about computer system 100 and providing it to management database 104. Interface 204 to HMI 106 is also used for updating the state of computer system 100 when the state of management database 104 is updated. Management database 104 can be built by reading a resource configuration file 206. Resource configuration file 206 is used by a system integrator to configure the information about the set of management instruments and the set of management capabilities. A database initialization module 208 builds management database 104 based on resource configuration file 206. Management database 104 is built when computer program 102 is started for execution. Computer program 102 also includes API 110 and a command line interface (CLI) 210. API 110 enables administration of the hardware platform. The hardware platform can be administered by user application program 108 through API 110. In an embodiment of the invention, API 110 may conform to the standards as defined in the HPI specification. Further, CLI 210 also enables administration of the hardware platform by reading and updating the state of the set of management instruments and the set of management capabilities in management database 104. CLI 210 provides access to management database 104 in a similar manner as API 110. CLI 210 can also provide access to the parts of management database 104 that are not accessible through API 110. In particular, a management instrument may be configured as a private management instrument, in which case it is not accessible by API 110, but accessible by CLI 210. Also, the data in management database 104 that are not available to API 110 can be updated through CLI 210. For example, if API 110 corresponds to the standards defined in the HPI specification, it may not be possible to change the state of some management instruments through API 110. These management instruments may be in 'automatic' mode or have 'read only' states as defined in the HPI specification. The state of these management instruments can be changed through CLI 210 and not through API 110. In an embodiment of the invention, CLI 210 can be connected to an administrative interface 212 to enable the system administrator to enter and run the commands for execution by CLI 210. Administrative interface 212 can be a console 'tty-type' interface for running the commands.

Computer program 102 can further include a policy execution module 214 to enable execution of a policy of one or more policies by CLI 210. The one or more policies are defined in management database 104 through resource configuration file 206. Each of the one or more policies is associated with a pre-defined trigger event of one or more pre-defined trigger events, and gets executed automatically in occurrence of the same. In an embodiment of the invention, the one or more pre-defined trigger events may include a state change in a sensor, enabling or disabling of the sensor, regular polling a sensor for a new value, expiration of a watchdog timer, setting a control to a new value, auto-insertion or autoextraction of the resource according to the HPI 'managed hot-swap' capability, a change of hot-swap state or hot-swap indicator state, requesting a power or reset operation of the managed system, and start-up of the resource. A policy includes one or more policy commands. Each command can be either a command that can be executed by CLI 210 or a special policy command that controls the execution of the policy. The one or more policy commands can be defined for reading and updating the state of the set of management instruments and the set of management capabilities. The execution of a policy is used to perform autonomous functions on the set of management instruments and the set of management capabilities. In accordance with various embodiments of the invention, the execution of a policy has been explained in detail in conjunction with FIG. 3 and FIGS. 4a and 4b.

Figure 3:
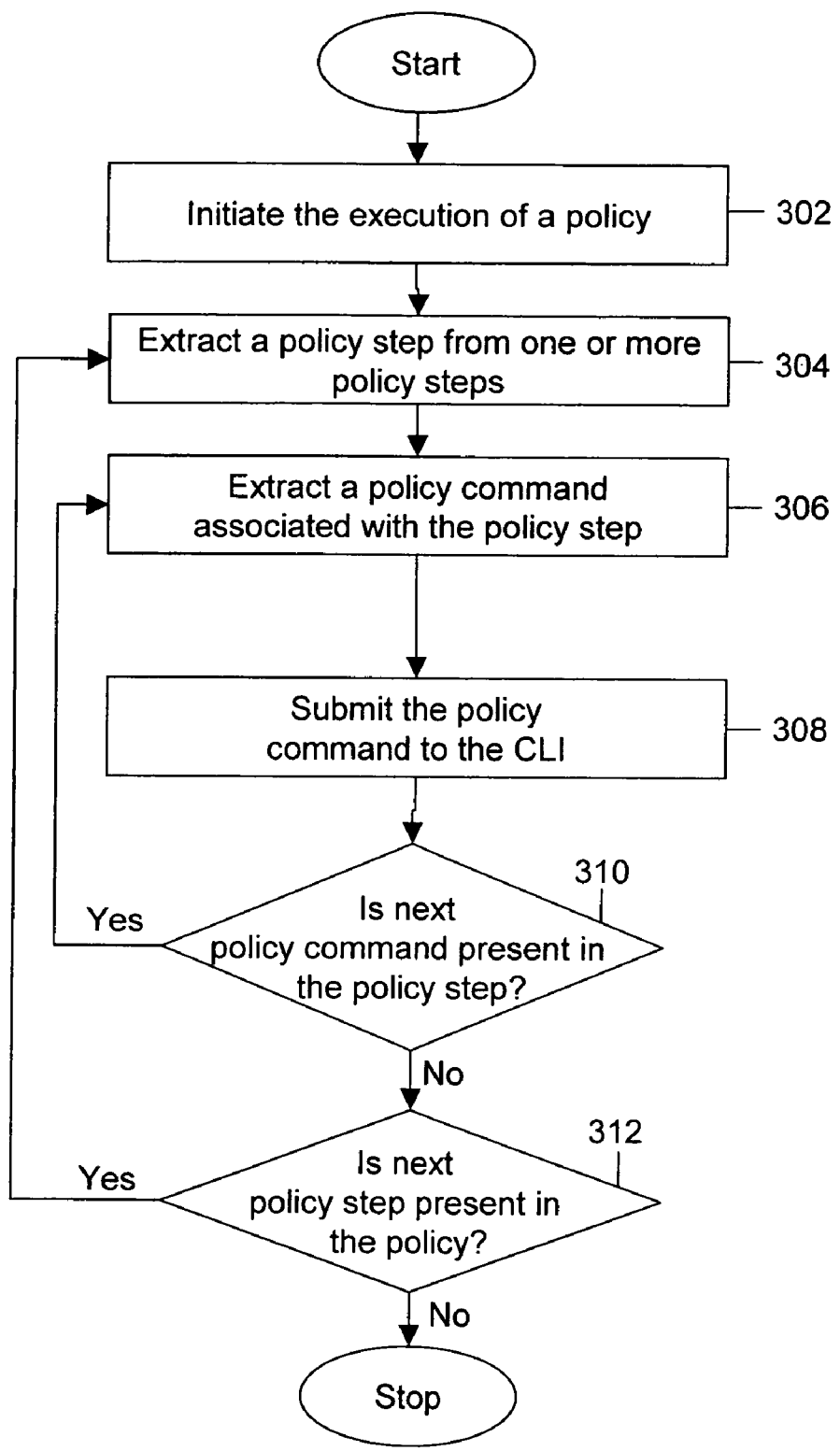
FIG. 3 is a view illustrating a flowchart of a method for enabling the execution of the policy, in accordance with an embodiment of the invention.

FIG. 3 is a view illustrating a flowchart of a method for enabling the execution of the policy, in accordance with an embodiment of the invention. In this embodiment of the invention, the control of the order of the execution of the policy has not been considered. At step 302, the execution of the policy can be initiated. The execution of the policy is initiated by first detecting the pre-defined trigger event associated with the policy. If the pre-defined trigger event is detected, the policy is identified out of the one or more policies defined in management database 104. After identifying the policy, a policy context can be initiated for facilitating the execution of the policy. The policy context can be a transient control block that keeps track of the execution of the policy. In an embodiment of the invention, the policy can consist of one or more policy steps. A policy step can include multiple policy commands. The execution can be tracked by means of a program counter in the policy context that knows which policy command of the policy step is getting executed currently. In an embodiment of the invention, the policy context also maintains information about delays introduced in the policy. If a delay period is introduced with a policy command, then the next command of the policy step is executed after the delay period. The policy context also maintains interim evaluated data that is to be submitted to the policy command in case of evaluation of an expression inserted in the policy command.

After initiating the policy context corresponding to the policy, a policy step from one or more policy steps can be extracted, at step 304. A policy command of the multiple commands can be extracted from the policy step, at step 306. The policy command is submitted to CLI 210 for execution, at step 308. At step 310, a condition is checked to determine whether a next policy command is present in the policy step. If the next policy command is present in the policy step, the execution of the policy can be transferred to step 306, where the next policy command can be extracted. If the next policy command is not present, a condition can be checked whether a next policy step is present in the policy, at step 312. If the next policy step is present in the policy, the execution of the policy can be transferred to step 304. The transfer of the execution of the policy to step 304 and step 306 can be performed by the policy context. If the next policy step is not present in the policy, the execution of the policy is stopped.

The method for enabling the execution of the policy as described in conjunction with FIG. 3 is not subject to limit the method to only this embodiment of the invention. Various modifications and variations of this embodiment of the invention are covered in the scope of the invention.

Figure 4A:
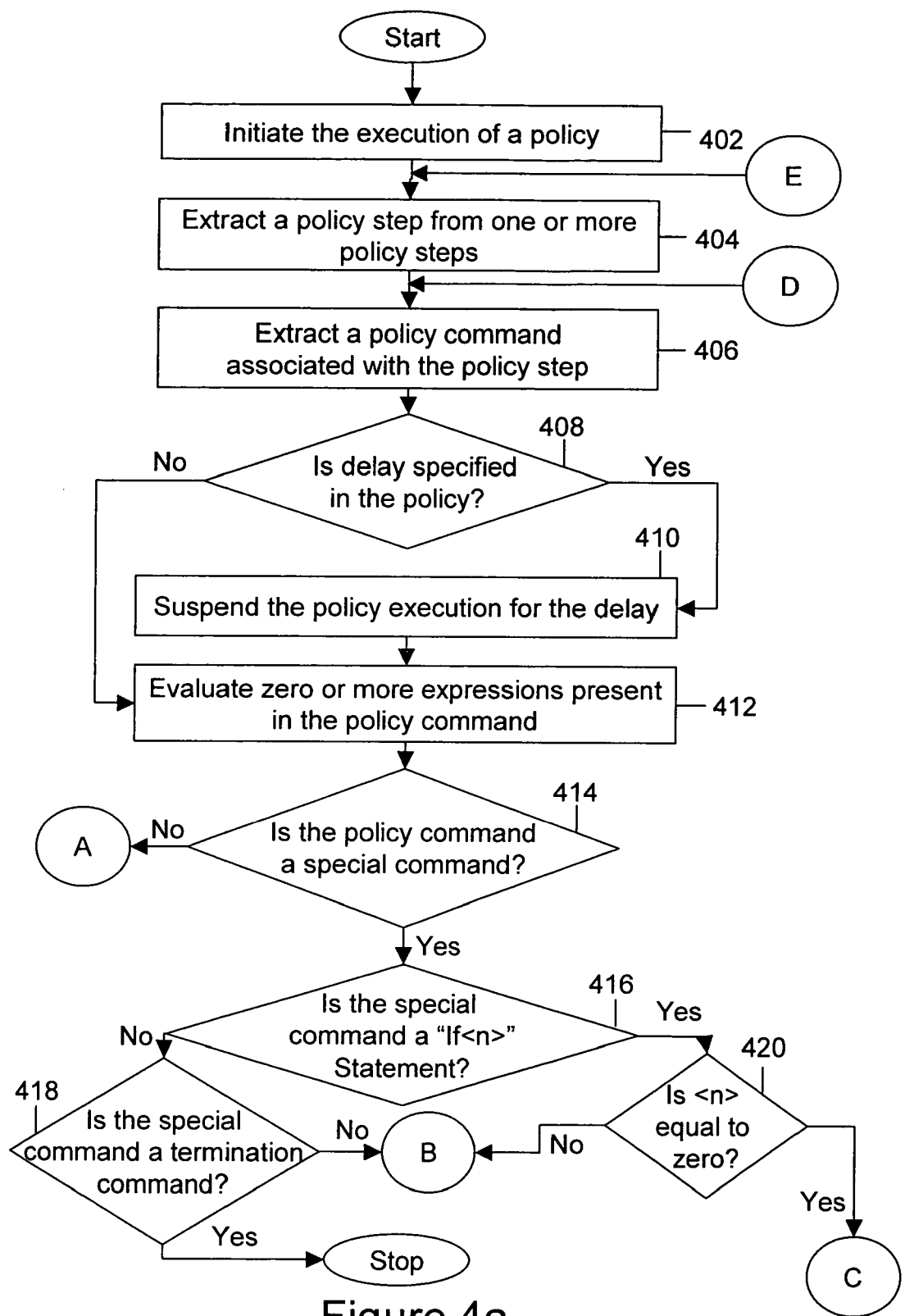
FIGS. 4a and 4b is a view illustrating a flowchart of a method for enabling the execution of the policy, in accordance with another embodiment of the invention.
Figure 4B:
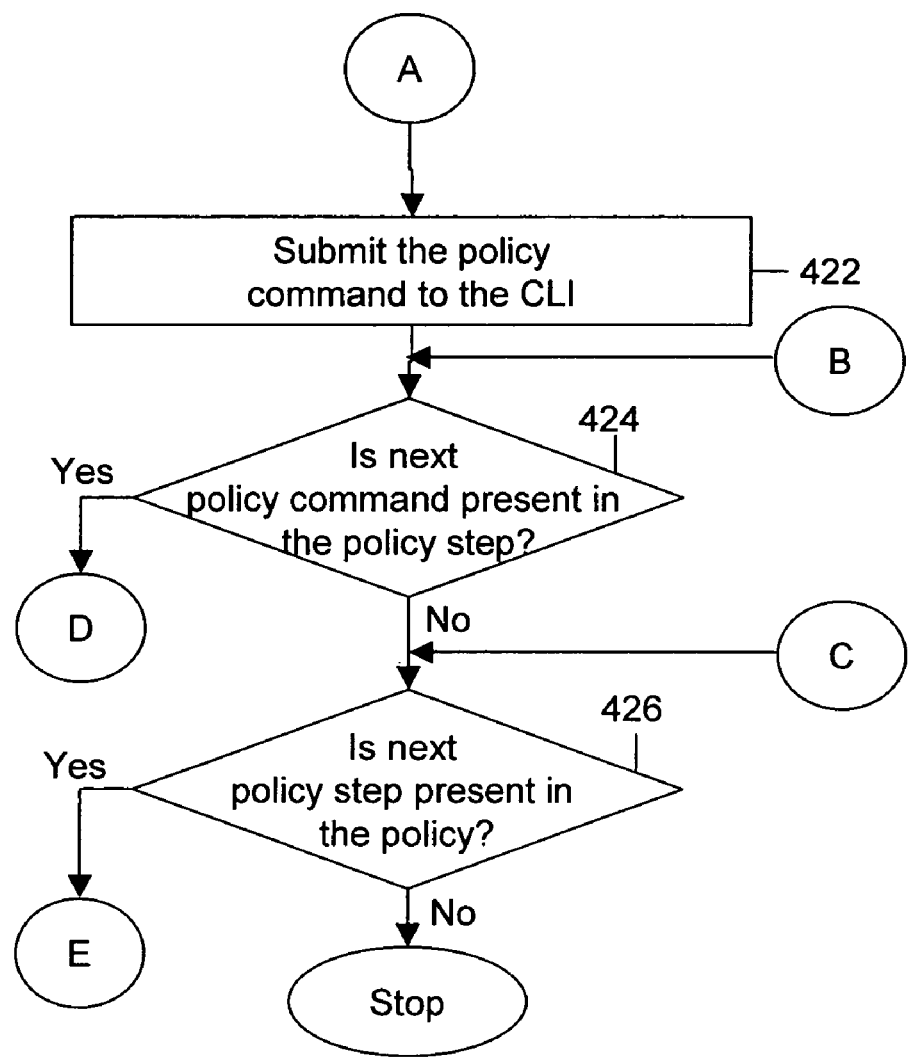

FIGS. 4a and 4b is a view illustrating a flowchart of a method for enabling the execution of the policy, in accordance with another embodiment of the invention. At step 402, the execution of a policy is initiated. The policy step is extracted from the policy, at step 404. At step 406, the policy command is then extracted from the multiple policy commands belonging to the policy step. In accordance with an embodiment of the invention, at step 408, a condition is checked to determine whether a delay period is specified in the policy command. The condition can be checked by observing a prefix in the policy command. The prefix can be observed in the policy command by parsing the policy command. If the prefix exists, it specifies the delay period. After observing the delay period from the prefix, the execution of the policy is suspended for the delay period, at step 410, and then resumed. After resuming the execution of the policy, zero or more expressions present in the policy command can then be evaluated, at step 412. If the delay period is not specified with the policy command, the zero or more expressions can directly be evaluated, at step 412. The policy command can then be updated with the computed values of the zero or more expressions. The zero or more expressions can be evaluated by parsing the policy command. An expression can be a variable expression that can access the data stored in management database 104 through pre-defined variables, and combine this data with numeric operations including algebraic operations, comparison operations, logical operations, and assignment operations. The pre-defined variables are used to access one or more of sensor readings, sensor status, control status, watchdog timer status and other information that is stored in management database 104. After evaluating the zero or more expressions, a condition can be checked whether the policy command is a special policy command at step 414.

If the policy command is not a special policy command, the policy command can be submitted to CLI 210 for execution, at step 422. After submitting the policy command to CLI 210 for execution, a condition can be checked, at step 424, whether a next policy command is present in the policy step. If the next policy command is present in the policy step, the execution of the policy can be transferred to step 406 where the next policy command is extracted. If the next policy command is not present in the policy step, a condition can be checked to determine whether a next policy step is present in the policy, at step 426. If the next policy step is present in the policy, the execution of the policy can be transferred to step 404. If the next policy command is not present in the policy, the execution of the policy is stopped.

If the policy command is a special policy command, a condition is checked to determine whether the special policy command is a pre-defined statement, at step 416. For example, the predefined statement can be a 'If<n>' statement, which can determine execution of various actions based on the value of 'n'. If the special policy command is not the pre-defined statement, at step 418, a condition is checked to determine whether the special policy command is a termination command that can be a 'Stop' statement. If the special policy command is the termination command, the execution of the policy is stopped. If the special policy command is not the termination command, the execution of the policy is transferred to the next policy command of the policy step. The execution of the policy is transferred to the next policy command by transferring the execution to step 424.

If the special policy command is the pre-defined statement, a condition is checked to determine whether the value of 'n' is equal to zero, at step 420. If the value of 'n' is not equal to zero, the execution of the policy is transferred to the next policy command of the policy step. The execution of the policy is transferred to next policy command by transferring the execution to step 424. If the value of 'n' is equal to zero, the execution of the policy is transferred to the next policy step of the policy by skipping the execution of any more policy commands in the current policy step. The execution of the policy is transferred to the next policy step by transferring the execution to step 426.

In one embodiment of the invention, the special policy command can also be used to suspend the execution of the policy by the delay period. For example, after checking whether the policy command is the special policy command, a condition can further be checked if the special policy command is a 'Sleep' command. If the special command is the 'Sleep' command, a delay period as specified in the 'Sleep' command can be identified and the execution of the policy can be suspended for the delay period. As another example, the 'Sleep' command could indicate a condition which must be met before the policy execution is continued. Thus, the execution of the policy can be controlled by the special policy command by either suspending the execution, terminating the execution of the policy or transferring the execution of the policy to the next policy command or the next policy step.

In an embodiment of the invention, more complex pre-defined statements like 'if/then/else', 'while', and 'switch/case' constructs and nested structures of these can also be used for controlling the execution of the policy.

The method for enabling the execution of the policy as described in conjunction with FIGS. 4a and 4b is not subject to limit the method to only this embodiment of the invention. Various modifications and variations of this embodiment of the invention are covered in the scope of the invention.

In an embodiment of the invention, a set of pre-defined policies of the one or more policies can be executed to implement a set of virtual management instruments and a set of virtual management capabilities. A virtual management instrument is configured in management database 104 like any other management instrument, but it is not accessible by HMI 106. The virtual management instrument can be implemented by referencing one or more management instruments of the set of management instruments in the pre-defined policies that are triggered by events associated with the virtual management instrument. The one or more management instruments can be referenced to derive a value for the virtual management instrument that is based on the state of the one or more referenced management instruments The state of the one or more management instruments may be changed based on changes of state in the virtual management instrument. The virtual management instrument may also be implemented by referencing it in the pre-defined policies that are triggered by events associated with one or more other management instruments. The pre-defined policies associated with the one or more management instruments can update the state of the virtual management instrument when the pre-defined policies are executed.

Figure 5:
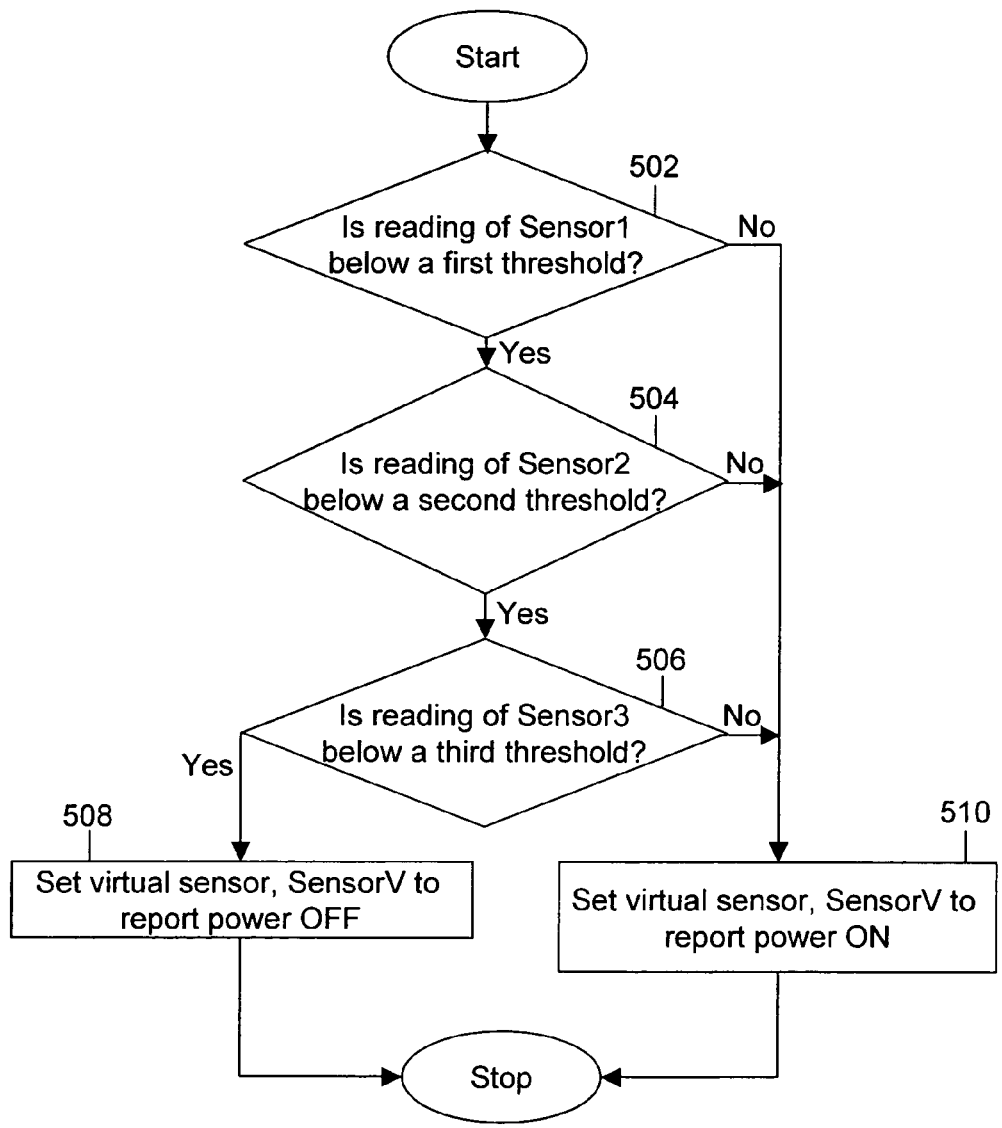
FIG. 5 is a view illustrating a flowchart of a method for execution of a 'Sensor reading' policy to implement a virtual sensor, in accordance with an embodiment of the invention.

FIG. 5 is a view illustrating a flowchart of a method for the execution of a 'Sensor reading' policy to implement a virtual sensor, in accordance with an embodiment of the invention. In this embodiment of the invention, virtual sensor SensorV refers to Sensor1, Sensor2 and Sensor3 to derive a state for SensorV. The values read by Sensor1, Sensor2 and Sensor3 can be referred by evaluating the expressions present in the policy commands of the Sensor reading policy for SensorV. Sensor1, Sensor2 and Sensor3 can be tied to different hardware power monitors via HMI 106 that determine whether an appropriate power input is available for the hardware. Sensor1, Sensor2 and Sensor3 are management instruments that are exposed to API 110 as they provide valuable information. In one embodiment of the invention, Sensor1, Sensor2 and, Sensor3 can be private management instruments that are not exposed to API 110 for access to user application program 108. After initiating the execution of the Sensor reading policy, a condition can be checked, at step 502, to determine whether reading of Sensor1 is below a first threshold value. The first threshold value corresponds to the value of a first power supply needed for the hardware. If the reading of Sensor1 is below the first threshold value, at step 504, a condition is checked to determine whether reading of Sensor2 is below a second threshold value. The second threshold value corresponds to the value of a second power supply needed for the hardware. If the reading of Sensor2 is below the second threshold value, at step 506, a further condition is checked to determine whether reading of Sensor3 is also below a third threshold value. The third threshold value corresponds to the value of a third power supply needed for the hardware. If the reading of Sesnor3 is also below the third threshold value, SensorV is set to report that the power to the hardware is OFF, at step 508. In case, either of Sensor1, Sensor2 and Sensor3 shows the reading that is not below the first threshold value, the second threshold value and the third threshold value respectively, SensorV is set to report that the power to the hardware is ON, at step 510. Thus Sensor1, Sensor2 and Sensor3 are referenced by SensorV by means of the Sensor reading policy to derive a value for SensorV.

Figure 6A:
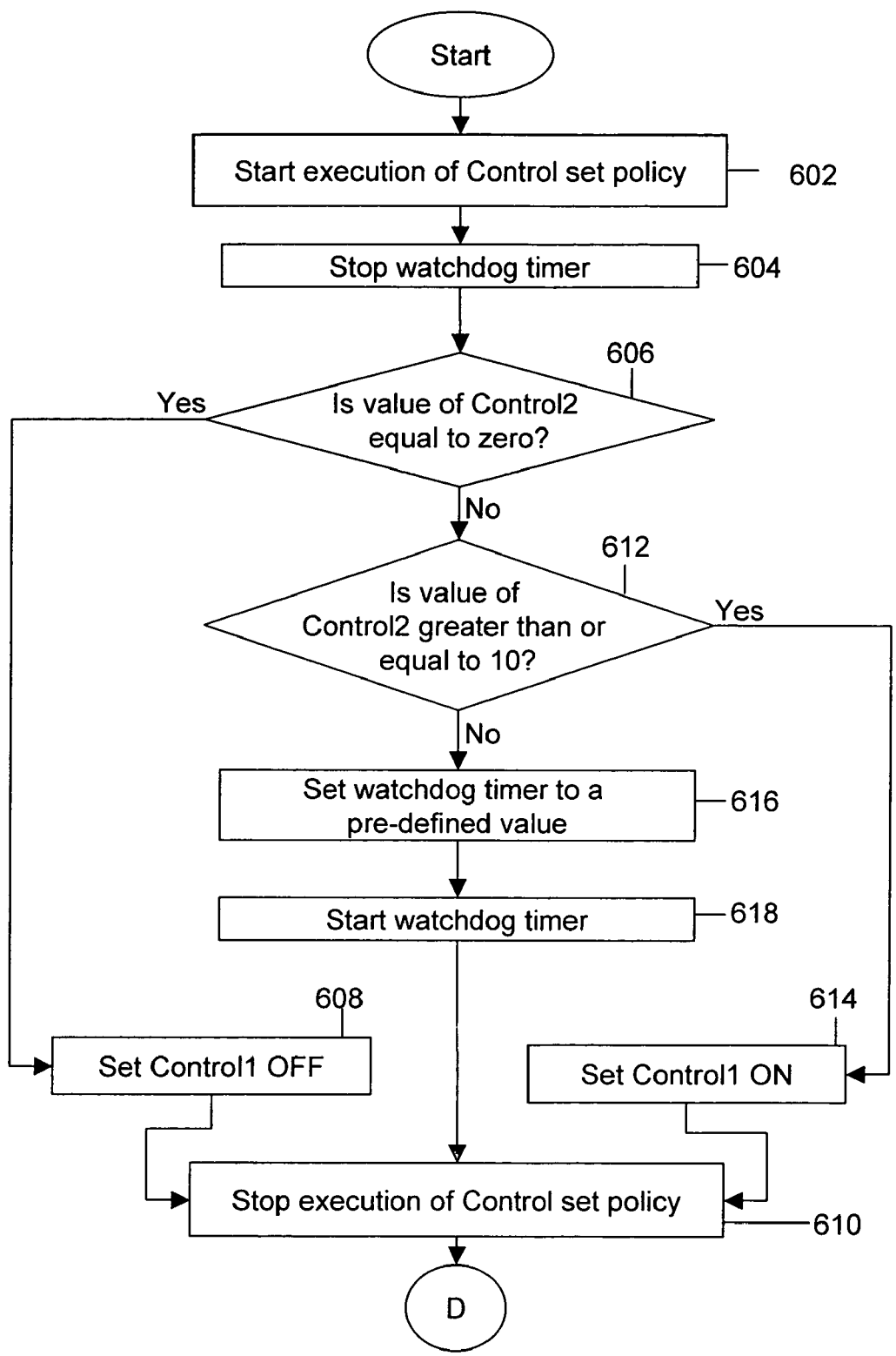
FIGS. 6a and 6b is a view illustrating a flowchart of a method for implementing a virtual control that can make a LED blink at pre-defined rate, in accordance with an embodiment of the invention.
Figure 6B:
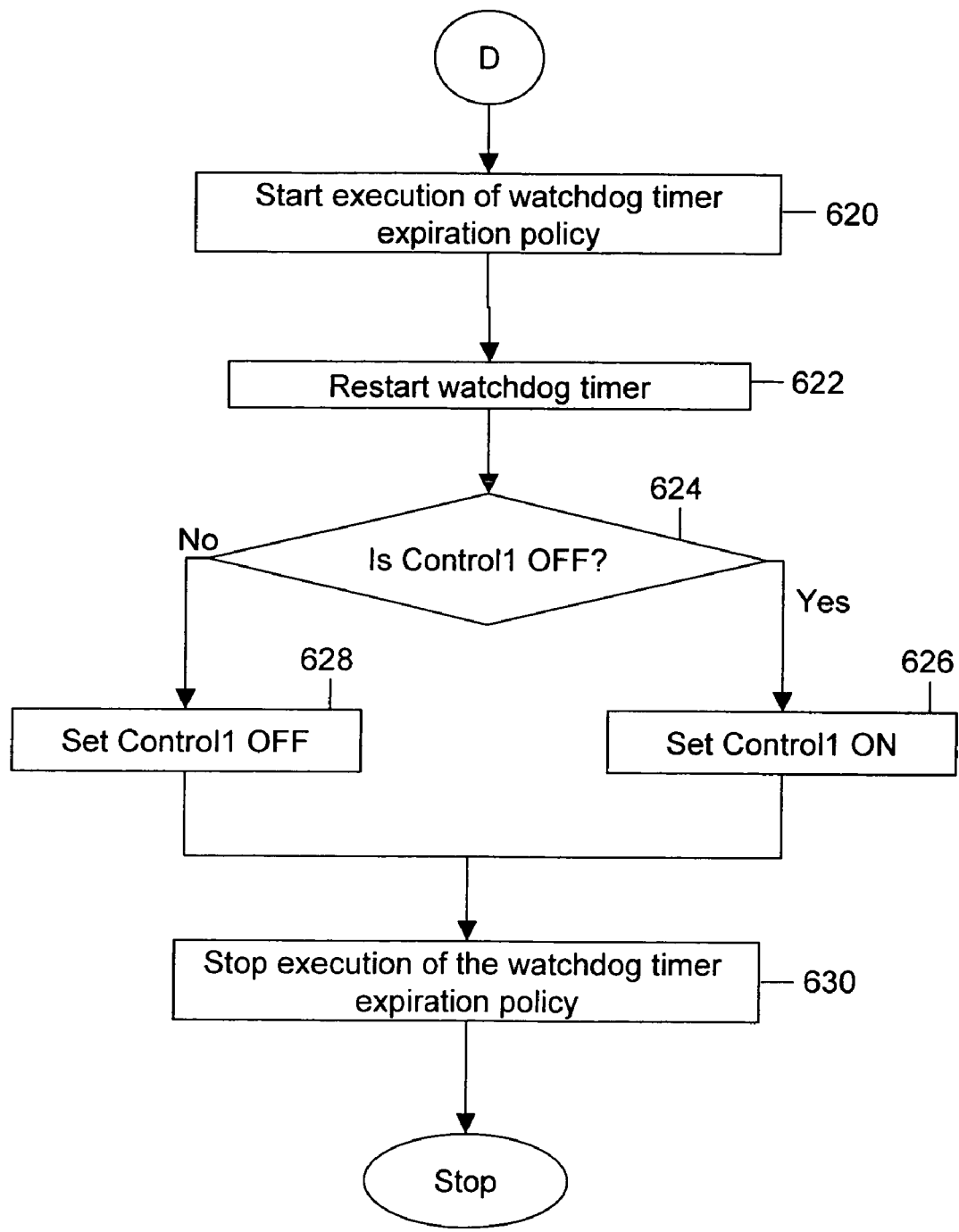

FIGS. 6a and 6b represent a view illustrating a flowchart of a method for implementing a virtual control that can make a LED blink at a pre-defined rate, in accordance with an embodiment of the invention. In this embodiment of the invention, the hardware platform provides an LED control that can be turned solidly ON and OFF via HMI 106. However, there may be a need for a LED control that allows an operator via API 110 to not only set the LED ON and OFF but also to make it blink at a number of different rates. It is required by the operator that when the value of the virtual control is set to be zero, the LED should be OFF, if the value is greater than or equal to 10, the LED should be ON, and if the value is between 1 and 9, both inclusive, the LED should blink at various rates.

A physical LED control, Control1 is tied to the hardware via HMI 106 and configured to turn the LED ON and OFF via this hardware capability. If Control1 is set to be ON/OFF, the LED is also ON/OFF respectively. In this embodiment of the invention, Control1 is configured to be a private management instrument so that it is not accessible directly via API 110. The virtual control, Control2, includes a Control set policy. The Control set policy operates on two management instruments, Control1 and a watchdog timer, to make Control2 work. The watch dog timer is also configured to be a private management instrument that is not directly accessible from API 110. Control2 is not directly connected to the hardware but is accessible via API 110. When user application program 108, via API 110 sets the value of Control2, the Control set policy is triggered. The execution of the Control set policy is started, at step 602. After the initiation of the execution of the Control set policy, the watchdog timer is stopped at step 604. At step 606, a condition is checked to determine whether value of Control2 is equal to zero. If the value of Control2 is equal to zero, Control1 is set to be OFF, at step 608. After setting Control1 to be OFF, the execution of the Control set policy is stopped, at step 610. If the value of Control2 is not equal to zero, at step 612, a condition is checked to determine whether the value of Control2 is greater than or equal to 10. If the value of Control2 is greater than or equal to 10, Control1 is set to be ON, at step 614. The execution of the Control set policy is then stopped, at step 610. If the value of Control2 is determined not to be greater than and equal to 10, at step 612, the watch dog timer is set to a pre-defined time, at step 616. The pre-defined time is calculated by multiplying the value of Control2 as supplied by user application program 108 via API 110, by 100 ms. The pre-defined time is then used to run the watchdog timer. After setting the watchdog timer to the pre-defined time, the watchdog timer is started running, at step 618, and the execution of the Control set policy is stopped. When the watchdog timer expires, a watchdog expiration policy is triggered. At step 620, the execution of the watchdog timer expiration policy is started. Each time the watchdog timer expires, it is restarted, at step 622. Then, at step 624, the current state of Control1 is examined to determine whether Control1 is OFF. If Control1 is OFF, it is set to be ON, at step 626, and the execution of the watchdog timer expiration policy is stopped, at step 630. If Control1 is not OFF, it is set to be OFF, at step 628, and at step 630, the watchdog timer expiration policy is stopped. By setting Control1 ON and OFF each time the watchdog timer expires and the watchdog timer expiration policy is executed, the LED is also turned ON and OFF repeatedly. Thus, the LED is made to blink at a rate determined by the value of Control2 as set by user application program 108.

Embodiments of the invention provide the advantage of facilitating customization of the set of management instruments and the set of management capabilities included in the management database. The customization can be achieved without making any changes in the software that implements the computer program. The customization is achieved by changing the configuration file. This allows using a universal computer program that can be used with different computer systems by making changes in the configuration file. Further, embodiments of the invention provide a method that enables dynamic changes in the configuration and operational data of the set of management instruments by executing CLI commands.

Embodiments of the invention also provide the advantage that autonomous functions can be implemented by defining various policies in the management database through the resource configuration file. As the execution order of a policy can be changed dynamically by special policy commands, the autonomous functions can be defined to react appropriately to various conditions in the computer system.

Moreover, virtual sensors and controls performing high-level control can be created easily by manipulating the configuration file, adding to the manageability of the computer system without changes in the hardware or low-level management infrastructure.

While the foregoing is directed to embodiments of the present invention, other and further embodiments of the invention may be devised without departing from the basic scope thereof, and the scope thereof is determined by the claims that follow.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

Although the invention has been discussed with respect to specific embodiments thereof, these embodiments are merely illustrative, and not restrictive, of the invention.

A "computer program product" for purposes of embodiments of the invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Any suitable programming language can be used to implement the routines of the invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as Digital Signal Processing etc. The routines can operate in audio encoding environment or as stand-alone routines occupying all, or a substantial part, of the system processing.

What is claimed is:

1. A computer program product, the computer program product comprising a non-transitory computer readable medium including computer program code for platform management of high-availability computer systems, the computer program code comprising instructions for:
   a) a management database for modeling a computer system of the one or more high-availability computer systems, the management database comprising a set of management instruments and a set of management capabilities, the set of management instruments and the set of management capabilities being used for reflecting and changing the current state of the computer system;
   b) an application program interface (API) for administering the hardware platform of the computer system, the hardware platform being administered by reading the state of the set of management instruments and the set of management capabilities from the management database, and updating the state of the set of management instruments and the set of management capabilities in the management database;
   c) a command line interface (CLI) for administering the hardware platform of the computer system, the CLI being capable of reading the state of the set of management instruments and the set of management capabilities from the management database and updating the state of the set of management instruments and the set of management capabilities in the management database; and
   d) a policy execution module for enabling execution of a policy of one or more policies stored in the management database, the policy including one or more policy commands to be executed by the CLI automatically on the occurrence of a pre-defined trigger event of one or more pre-defined trigger events, the policy being used to perform autonomous functions on the set of management instruments and the set of management capabilities defined in the management database.

2. The computer program product according to claim 1, wherein the software further comprises a database initialization module for building the management database by means of a resource configuration file, the resource configuration file being used by a system integrator to configure the information about the set of management instruments and the set of management capabilities.

3. The computer program product according to claim 1, wherein the software further comprises an interface to one or more hardware management interfaces for providing information about the hardware platform to the management database, the one or more hardware management interfaces collecting status information from the hardware platform.

4. The computer program product according to claim 1, wherein the software further comprises instruction means for configuring one or more management instruments from the set of management instruments as private management instruments, the private management instruments not being accessible by the API.

5. The computer program product according to claim 1, wherein the software further comprises instruction means for implementing a set of virtual management instruments and a set of virtual management capabilities by executing a set of pre-defined policies of the one or more policies.

6. The computer program according to claim 5, wherein the instruction means for implementing the set of virtual management instruments and the set of virtual management capabilities comprises instruction means for referencing one or more management instruments from the set of the management instruments.

7. The computer program product according to claim 1, wherein the management database comprises a database maintenance module for continuously updating the state of the set of management instruments and the set of management capabilities.

8. The computer program product according to claim 1, wherein the set of management instruments comprises one or more of sensors, controls, watchdog timers, inventory data repositories, and annunciators.

9. The computer program product according to claim 1, wherein the set of management capabilities comprises one or more of power control, reset control, configuration parameter control, hot swap management, event generation, and event log maintenance.

10. The computer program product according to claim 1, wherein the CLI being accessible from an administrative interface for allowing a system administrator to execute commands by the CLI.

11. The computer program product according to claim 1, wherein the API conforms to the standards as defined in the Hardware Platform Interface (HPI) specification provided by the Service Availability Forum (SAF).

12. The computer program product according to claim 1, wherein the policy execution module comprises:
 a) instruction means for initiating the execution of the policy;
 b) instruction means for extracting a policy command of the one or more policy commands;
 c) instruction means for submitting the policy command to the CLI for the execution if the policy command is not a special policy command; and
 d) instruction means for controlling the execution of the policy if the policy command is a special policy command.

13. The computer program product according to claim 12, wherein the instruction means for initiating the execution of the policy comprises:
 a) instruction means for detecting the pre-defined trigger event;
 b) instruction means for identifying the policy of the one or more policies, the policy corresponding to the pre-defined trigger event; and
 c) instruction means for initiating a policy context for facilitating the execution of the policy.

14. The computer program product according to claim 1, wherein the policy execution module comprises instruction means for evaluating zero or more expressions contained in the policy command, the policy command being updated with the computed value of each of the zero or more expressions.

15. A method for platform management of one or more high-availability computer systems, the method comprising:
 a) configuring a management database for modeling a computer system of the one or more high-availability computer systems, the management database comprising a set of management instruments and a set of management capabilities, the set of management instruments and the set of management capabilities being used for reflecting and changing the current state of the computer system;
 b) administering the hardware platform of the computer system using an application program interface (API), the hardware platform being administered by reading the state of the set of management instruments and the set of management capabilities from the management database, and updating the state of the set of management instruments and the set of management capabilities in the management database;
 c) administering the hardware platform of the computer system using a command line interface (CLI), the hardware platform being administered by reading the state of the set of management instruments and the set of management capabilities from the management database, and updating the state of the set of management instruments and the set of management capabilities in the management database; and
 d) enabling execution of a policy of one or more policies stored in the management database, the policy including one or more policy commands to be executed by the CLI automatically on the occurrence of a pre-defined trigger event of one or more pre-defined trigger events, the policy being used to perform autonomous functions on the set of management instruments and the set of management capabilities.

16. The method according to claim 15 further comprising configuring one or more management instruments from the set of management instruments as private management instruments, the private management instruments not being accessible by the API.

17. The method according to claim 15 further comprising implementing a set of virtual management instruments and a set of virtual management capabilities by executing a set of pre-defined policies of the one or more policies.

18. The method according to claim 17, wherein the implementing the set of virtual management instruments and the set of virtual management capabilities comprises referencing one or more management instruments from the set of the management instruments.

19. The method according to claim 15, wherein the enabling the execution of the policy comprises:
 a) initiating the execution of the policy;
 b) extracting a policy command of the one or more policy commands;
 c) submitting the policy command to the CLI for the execution if the policy command is not a special policy command; and
 d) controlling the execution of the policy if the policy command is a special policy command.

20. The method according to claim 19, wherein the initiating the execution of the policy comprises:
 a) detecting the pre-defined trigger event;
 b) identifying the policy of the one or more policies, the policy corresponding to the pre-defined trigger event; and c) initiating a policy context for facilitating the execution of the policy.

21. The method according to claim 15, wherein the enabling the execution of the policy further comprises evaluating zero or more expressions contained in the policy command, the policy command being updated with the computed value of each of the zero or more expressions.

22. A system for platform management of one or more high-availability computer systems, the system comprising:
   a computing device, including a processor, the processor executing instructions configured to provide:
   a) a management database for modeling a computer system of the one or more high-availability computer systems, the management database comprising a set of management instruments and a set of management capabilities, the set of management instruments and the set of management capabilities being used for reflecting and changing the current state of the computer system;
   b) an application program interface (API) for administering the hardware platform of the computer system, the hardware platform being administered by reading the state of the set of management instruments and the set of management capabilities from the management database, and updating the state of the set of management instruments and the set of management capabilities in the management database;
   c) a command line interface (CLI) for administering the hardware platform of the computer system, the CLI being capable of reading the state of the set of management instruments and the set of management capabilities from the management database and updating the state of the set of management instruments and the set of management capabilities in the management database; and
   d) a policy execution module for enabling execution of a policy of one or more policies stored in the management database, the policy including one or more policy commands to be executed by the CLI automatically on the occurrence of a pre-defined trigger event of one or more pre-defined trigger events, the policy being used to perform autonomous functions on the set of management instruments and the set of management capabilities defined in the management database.

23. The system according to claim 22, wherein the set of management instruments comprises one or more of sensors, controls, watchdog timers, inventory data repositories, and annunciators.

24. The system according to claim 22, wherein the set of management capabilities comprises one or more of power control, reset control, configuration parameter control, hot swap management, event generation, and event log maintenance.

25. The system according to claim 22, wherein the API conforms to the standards as defined in the HPI specification provided by the SAF.

26. The system according to claim 22, wherein the management database comprises a database maintenance module for continuously updating the state of the set of management instruments and the set of management capabilities, stored in the management database.

27. The system according to claim 22 further comprising a database initialization module for building the management database by means of a resource configuration file, the resource configuration file being used by a system integrator to configure the information about the set of management instruments and the set of management capabilities.

28. The system of claim 22 further comprising an interface to one or more hardware management interfaces for providing information about the hardware platform to the management database, the one or more hardware management interfaces collecting status information from the hardware platform.

29. The system according to claim 22, wherein one or more management instruments from the set of management instruments being configured as private management instruments, the private management instruments not being accessible by the API.

30. The system according to claim 22, wherein the CLI being accessible from an administrative interface for allowing a system administrator to execute commands by the CLI.

* * * * *